United States Patent [19]
Gustafson

[11] 3,892,721

[45] July 1, 1975

[54] COPOLYMERIZED HARD PLASTIC HYDROGEL COMPOSITIONS

[76] Inventor: Robert Gustafson, 5129 N. St. Louis Ave., Chicago, Ill. 60625

[22] Filed: Nov. 10, 1972

[21] Appl. No.: 305,303

Related U.S. Application Data

[63] Continuation-in-part of Ser. No. 168,769, Aug. 3, 1971, Pat. No. 3,728,315.

[52] U.S. Cl............ 260/80.75; 260/86.1 E; 351/160
[51] Int. Cl. ............................................. C08f 15/40
[58] Field of Search ...................... 260/80.75, 86.1 E

[56] References Cited
UNITED STATES PATENTS

| | | | |
|---|---|---|---|
| 2,884,386 | 4/1959 | McMillan et al. ................... | 260/2.5 |
| 3,361,696 | 1/1968 | Bolgiano et al. .................... | 260/29.7 |
| 3,728,315 | 4/1973 | Gustafson ....................... | 260/80.75 |

FOREIGN PATENTS OR APPLICATIONS

| | | | |
|---|---|---|---|
| 2,009,296 | 12/1970 | Germany ........................... | 260/86.1 |

*Primary Examiner*—Stanford M. Levin
*Attorney, Agent, or Firm*—Dominik, Knechtel, Godula & Demeur

[57] ABSTRACT

A shape-retaining cross-linked polymer formed from monomers and copolymers including from about 0% to about 50% by weight of the total composition of an alkylene glycol methacrylate, said alkylene chain having from one to three carbon atoms, from about 0 percent to about 49 percent by weight of a hydroxy alkyl methacrylate, said alkyl having from one to three carbon atoms, wherein at least one of the alkylene glycol methacrylate and hydroxy alkyl methacrylate is present in the copolymer composition, and from about 50 percent to about 97 percent by weight of the copolymer of a compound being a member selected from the group consisting of alkyl acrylate and alkyl methacrylate, said alkyl group having one to four carbon atoms and a contact lens formed therefrom.

1 Claim, No Drawings

3,892,721

COPOLYMERIZED HARD PLASTIC HYDROGEL COMPOSITIONS

RELATED APPLICATIONS

The present application is a continuation in part application of applicant's U.S. Pat. No. 3,728,315, patented on Apr. 17, 1973, filed Aug. 3, 1971 Ser. No. 168,769 and entitled "COPOLYMERIZED HARD PLASTIC HYDROGEL COMPOSITIONS" in the name of applicant herein.

BACKGROUND OF THE INVENTION

Various types of plastic materials, especially adapted for use as contact lenses have been proposed and are known in the art. It has been found to be especially useful to utilize plastic materials which are hydrophilic in this art field since the ability to absorb and retain water has been found to be a useful characteristic where such plastic materials are formulated into contact lenses. In this connection, there has been a great deal of effort in two directions, one direction pointing to the production of hard plastic contact lenses, which are fairly rigid in structure, and not particularly hydrophilic or wettable and the other direction pointing in the area of soft plastic contact lenses, which are more pliable and therefore, of greater comfort when worn on the eye.

Various types of such hydrophilic plastic materials are disclosed in U.S. Pat. No. 3,220,960 which discloses various forms of cross-linked hydrophilic polymers and articles made therefrom, the final composition being a copolymer resulting from the copolymerization of a monomer having a polymerizable vinyl group such as styrene, with a small amount of a monomer having such groups as divinyl benzene, inorganic divinyl solutions resulting in a gel formed by cross-linked corresponding polymers and the solvent. U.S. Pat. No. 3,503,942 also discloses various forms of hydrophilic polymers and aqueous reaction media having a cross-linked polymeric hydrogel structure and have desirable properties. Such compositions are disclosed to be useful primarily as contact lenses for the reason that the polymer structure which results from the method and formulation set forth therein has a soft but elastic consistency and has a degree of permeability to afford ease of fluid transfer from the cornea of the eye.

The polymeric structures disclosed in the aforementioned patents, while having some modicum of success in terms of use as contact lenses, nevertheless have exhibited problems in terms of being machinable or being so hydrophilic as to cause undue expansion of the material and often times such expansion causes a change in the refractive index of the material, necessitating further adjustments after the contact lens has been formed.

In addition to the above, my copending application entitled "COPOLYMERIZED HYDROGEL COMPOSITIONS" filed on Oct. 19, 1970, under Ser. No. 82,105, also disclosed a composition which results in a soft plastic hydrogel composition which is particularly effective for use in a contact lens since the resulting composition has a low expansion ratio upon hydration, and is nevertheless sufficiently soft, resilient and flexible while at the same time being completely machinable whereby to provide all of the necessary characteristics required for contact lenses.

In my aforementioned copending application, the gist of the invention disclosed and claimed therein is to formulate a soft plastic hydrogel composition which is particularly suitable and useful as a contact lens. If has become apparent, however, that there is still a desire and need for a contact lens formed of a hard plastic material which will incorporate therein all of the necessary characteristics required for contact lenses, such as good optics, machinability, and compatability with the cornea of the eye as well as with the tear fluid existing therein. One of the problems associated with the present hard plastic contact lenses is that such hard plastic contact lenses are not sufficiently hydrophilic so as to allow the tear fluid to flow across the surface of the lens. The result is that the tear fluid tends to be repulsed by the plastic material leaving dry spots between the inner surface of the contact lens and the cornea of the eye. This results in irriation to the eye of the user and is not particularly desirable.

It is therefore the principal object of this invention to provide a hydrophilic cross-linked copolymeric hydrogel material which has a relatively low expansion ratio upon hydration and which is still sufficiently hard so as to be machinable without at the same time affecting the optics of the material.

In connection with the foregoing object, it is still another object of the present invention to provide a contact lens formed of the aforementioned hydrogel material which is extremely compatible with the cornea of the eye and the tear fluid, thereby permitting the user thereof to enjoy longer wearing time with greater comfort.

Still another object of the present invention is to provide a shape-retaining hydrogel body having a relatively low expansion ratio which includes from about 0 percent to about 50 percent by weight of the total composition of an alkylene glycol methacrylate, wherein the alkylene chain has from one to three carbon atoms, from about 0 percent to about 49 percent by weight of the total composition of a hydroxy alkyl methacrylate wherein the alkyl group has from 1 to 3 carbon atoms, wherein at least one of said alkylene glycol methacrylate and hydroxy alkyl methacrylate is present in said copolymer composition, and from about 50 percent to about 97 percent by weight of the composition of a member selected from the group consisting of alkyl acrylate and alkyl methacrylate said alkyl group having from one to four carbon atoms.

Yet a further object of the present invention is to provide a hydrophilic shape-retaining hydrogel body of the type set forth above, wherein the composition consists of from about 20 percent to about 35 percent by weight of the composition of triethylene glycol dimethacrylate, from about 4 percent to about 35 percent by weight of the composition of hydroxy ethyl methacrylate, and from about 55 percent to about 70 percent by weight of the composition of n-butyl methacrylate.

In connection with the foregoing object, it is yet another object of this invention to provide a hydrophilic shape-retaining hydrogel body of the type set forth, which includes 29 percent of triethylene glycol dimetharcylate, 14 percent of hydroxy ethyl methacrylate and 57 percent of n-butyl methacrylate, the aforementioned percentages being by weight of the final composition.

Other objects and advantages of the present invention will become apparent from the following description which is given primarily for purposes of illustration and not limitation.

In general, the above object and advantages of the present invention are obtained by the selection of proper monomers and copolymers and the selection of the ranges of amounts by weight of these materials, which are then reacted in order to effect cross-linking of the monomers and copolymers in a particular arrangement. The resulting material is hydrophilic and therefore, will hydrate to some extent upon contact with a liquid such as water. The criticality of the present invention resides in the particular monomers and copolymers which are reacted in accordance with the method of the present invention as well as the selection of the weight ranges of each of the materials of the composition in order to result in a material which has the proper hydrophilic characteristics, while at the same time being machinable after proper heat curing, to provide a material which may be cut and polished to form a contact lens. Hence, the present invention results in a hard plastic hydrogel composition which is particularly useful for contact lenses, being sufficiently hydrophilic to permit good compatibility of the plastic material with the cornea of the eye as well as the tear fluid, while at the same time being hard enough to be thoroughly machinable by cutting, polishing, grinding and the like, without affecting the optics thereof, whereby the user is permitted longer wearing time and with greater comfort.

The term "hydrophilic" is used herein in the broadest sense in that this term relates to the characteristics of a material having good surface compatibility with water, and not necessarily the water-imbibing characteristics of the material. The significant feature of the material of the present invention is that it has very good surface compatibility with water whereby the surface is extremely wettable and in fact, more surface-wettable than soft hydrophilic type plastic contact lenses although having a lesser degree of water-imbibing properties. It is therefore this feature which results in good compatibility of the contact lens formed of the material of the present invention with tear fluid and it is in this sense that the present material is hydrophilic.

One of the difficulties which has been experienced with presently existing and prior art hard plastic contact lenses is that such hard plastic contact lenses are not sufficiently wettable by the tear fluid in order to permit ease of tear fluid flow across the surface of the contact lens. This results in dry spots along the inner surface of the contact lens between that surface and the cornea of the eye which causes irritation and suffering to the user. The composition of the present invention therefore, provides a material which is a hard plastic that can be formulated into a contact lens which is sufficiently hydrophilic in order to permit good compatibility with the tear fluid resulting in good fluid exchange with the fluid under the lens, so that more oxygen is brought into the cornea than with other presently exisiting contact lenses. In this manner, contact lenses formed of the material of the present invention is of great aid in preventing conditions such as anoxia.

As has been indicated hereinabove, materials of which the present composition is formulated includes an alkylene glycol methacrylate, a hydroxy alkyl methacrylate and an alkyl methacrylate being a member selected from the group consisting of ethyl methacrylate and n-butyl methacrylate. The first of the aforementioned materials is an alkylene glycol methacrylate, generally having from one to three carbon atoms. This compound imparts hardness and rigidity to the resulting composition and has a tendency to harden and rigidify the composition. The preferred alkylene glycol methacrylate is triethylene glycol dimethacrylate and it has been found that the range within which this material may be used in the final composition is between 0 percent and 50 percent by weight of the final composition. Where this ingredient is eliminated from the final composition, then the hydroxy alkyl methacrylate must be present. In forming such compositions, it is necessary that either the alkylene glycol methacrylate or the hydroxy alkyl methacrylate be present in an amount of preferably no less than 3 percent by weight of the final composition, although the preferred embodiment incorporates both ingredients in the relative amounts more fully set forth hereinafter.

The next ingredient forming a part of the composition of the present invention is a hydroxy alkyl methacrylate wherein the alkyl group includes from one to about three carbon atoms. This ingredient is extremely hydrophilic and takes in a large volume of water on hydration and becomes very soft when hydrated. This ingredient functions therefore, to provide the hydrophilic characteristics necessary for the composition. Within the framework of the present invention, it has been found advisable to use from about 9 percent to about 49 percent by weight of the final composition of this component in order to render the final composition sufficiently hydrophilic thereby to provide sufficient wettability of the final composition and hence, a wettable plastic contact lens formulated therefrom. It is to be noted that when formulating soft plastic compositions for use as contact lenses, this particular component constitutes the major portion of the resulting resin plastic material, whereas when formulating hard plastic materials for use as contact lenses, the amount of this particular monomer must be reduced to the range indicated herein. In my copending application referred to hereinabove, it has been indicated advisable to use from about 50 percent to about 90 percent by weight of the finished product of this particular component in order to formulate a soft plastic material, whereas in the present invention it has been found advisable to reduce this component to a percentage range of between 0 percent and 49 percent by weight of the final formulation. The preferred monomer is hydroxy ethyl methacrylate, although other methacrylates such as hydroxy propyl methacrylate, show equally good results.

As indicated previously, either the alkylene glycol methacrylate or the hydroxy alkyl methacrylate may be eliminated from the composition so long as, in that event, a minimum amount of one of these ingredients is incorporated in the formulation. Either of these ingredients contain the active hydrophilic groups necessary to impart the wettable effect to the finished product and therefore, one or the other ingredient must be incorporated in the final formulation. It has been found that where the hydroxy alkyl methacrylate is eliminated, an amount of preferably at least 3 percent by weight of the final composition of the alkylene glycol methacrylate should be incorporated, and in the preferred embodiment, an amount of 15 percent by weight of the final composition of the alkylene glycol methacrylate will yield good results. For example, it has been found that triethylene glycol dimethacrylate gives a hydrophilic property to the finished product as well as acting as a crosslinking agent and may therefore be used alone with the alkyl acrylate or alkyl methacrylate.

The third ingredient of the composition of the present invention is an alkyl acrylate or alkyl methacrylate such as ethyl methacrylate or n-butyl methacrylate. This ingredient provides the softening characteristics of the final composition, and in order to achieve a balance between the hardening ingredient such as the triethylene glycol dimethacrylate and the softening ingredient such as n-butyl methacrylate, the softening ingredient is found to constitute the major portion of the final composition. Hence, an amount equal to between from about 50 percent to about 97 percent by weight of the final formulation of the alkyl acrylate or alkyl methacrylate is utilized. It has also been found that the alkyl acrylate or alkyl methacrylate component may be selected from compounds wherein the alkyl group may be all one alkyl having one to four carbon atoms or from compounds containing a blend of two or more alkyl groups having from 1 to 4 carbon atoms. In the preferred embodiment, it is proposed to select an alkyl methacrylate from the group consisting of ethyl methacrylate and n-butyl methacrylate.

In the process for formulating the cros-linked hydrophilic plastic material of the present invention, it has been found that when the three ingredients as described above are mixed together under heat conditions, the polymerization often occurs with great rapidity causing the resulting mass to crack or develop seams and is therefore unsuitable for subsequent use as a material for formulating contact lenses. Therefore, it has been found preferable to employ a catalyst in the initial mixture to adequately control and regulate the rate of polymerization of the ingredients. To this end, it has been found that the compounds 2,5 — dimethyl — 2,5 —bis(2 - ethyl hexanoyl peroxy) hexane, sold under the trademark Lubersol 256 functions as an efficient catalyst for regulating the aforementioned polymerization reaction. While undoubtedly, other catalysts will similarly be useful in connection with regulating the polymerization reaction, it has been found that the aforementioned catalyst operates sufficiently within the framework of the present invention to accomplish the intended function.

The process for making the cross-linked hydrophilic plastic materials of the present invention is relatively simple. The three ingredients consisting of the alkylene glycol methacrylate, the hydroxy alkyl methacrylate and the alkyl methacrylate are mixed together in the ratios indicated above along with from 0.5 to 1 percent by weight of the catalyst, Lubersol 256. The mixture is allowed to polymerize over a period of between 12 and 36 hours under conditions of heat at temperatures of between 110°F. and 150°F. The end point of the polymerization reaction can be observed visually by the solid appearance of the mass and this end point may be reached at any time within the noted period depending only upon the amounts of the various ingredients added and the amount of catalyst added. After copolymerization has occurred, the mass is removed and then allowed to cure for a period of 12 to 24 hours at a temperature between 160°F. and 190°F. Once the material has been adequately cured, the resulting plastic material is ready for use.

It is to be understood that while the description contained herein has specific reference to contact lenses, and in fact, the material is particularly adapted to that use, it should be apparent to those skilled in the art that the resin plastic material formulated in accordance with the present invention may have many other end uses, such as body implants and the like. However, to facilitate the following discussion and for ease of description, reference shall be made to an end use consisting of the formulation of contact lenses.

The method for formulating contact lenses from the plastic mass which has now been prepared is relatively simple and is known in the art. Briefly, the resulting plastic mass derived from the above process is a solid mass and therefore, one of two alternative methods of procedure is available. First, one may cut blanks from the solid mass and the blanks may be subsequently machined to the prescription required and subsequently polished by grinding and the like. Alternatively, one may formulate rod stock from which blanks are then cut and each of the blanks machined to a prescription as may be necessary. When these blanks are machined, preferably a polishing lubricant is utilized which lubricant is easily removable from the lenses. A suitable lubricant is a material such as castor oil, although other lubricants similarly useful are known to those skilled in the art and may be equally employed with good results. The resulting contact lens is characterized by being a hard plastic lens which is nevertheless sufficiently hydrophilic so as to be compatible with the tear fluid in order to achieve good exchange with the tear fluid under the lens enabling oxygen to be brought into the cornea thereby helping to prevent anoxia. In addition, such contact lenses are easily machinable, while nevertheless maintaining good optic characteristics.

Having described in general the materials forming the composition of the present invention, and the process for making contact lenses therefrom, there follows below specific examples showing the various embodiments of the present invention. The examples following below are intended to merely illustrate the invention and are not intended to limit same.

EXAMPLE I

A mixture of 29 grams of triethylene glycol dimethacrylate is blended together with 14 grams of hydroxy ethyl methacrylate and 56.25 grams of n-butyl methacrylate. To this mixture is then added .75 grams of the catalyst Lubersol 256. The resulting mixture is then blended and heated to a temperature of 130°F. for a period of 12 hours during which time the polymerization reaction occurs. The end point of polymerization is realized due to the solid appearance of the resulting mass.

The resulting mass is then allowed to cure by raising and maintaining the temperature at 180°F. for a period of 24 hours. The resulting composition is then ready for use by formulating the same into the desired appliance.

EXAMPLE II

The plastic composition formulated in accordance with Example 1 above, is then cut into a series of blanks which are machined into individual plastic contact lenses. The resulting contact lens is found to have good optic characteristics, is easily machinable, such as by grinding and polishing, and exhibits good compatibility characteristics with the tear fluid of the eye whereby good exchange with the tear fluid passing under the lens and between the lens and the cornea is achieved. It is observed that tear fluid flows easily across the surface of the lens, whereby no dry spots are observed.

EXAMPLE III

The process described in Example I is repeated utilizing the following ingredients in the amounts indicated (all amounts being computed by weight of the final composition):

| | | |
|---|---|---|
| Hydroxy ethyl methacrylate | — | 15% |
| Triethylene glycol dimethacrylate | — | 15% |
| Ethyl methacrylate | — | 69½% |
| Lubersol 256 (catalyst) | — | ½% |

The resulting formulation, upon curing, may then be formulated into the desired appliance with good results.

EXAMPLE IV

The process of Example I is again repeated utilizing the ingredients set forth below in the amounts indicated, all weights computed in terms of the final composition:

| | | |
|---|---|---|
| Hydroxy ethyl methacrylate | — | 15% |
| Ethyl methacrylate | — | 84½% |
| Lubersol 256 | — | ½% |

The resulting composition, upon curing, shows the same desirable properties described herein and functions adequately as a hard plastic contact lens material.

EXAMPLE V

The process of Example I is again repeated using the ingredients set forth below in the amounts indicated, the amounts again being computed on the basis of the final composition:

| | | |
|---|---|---|
| triethylene glycol dimethacrylate | — | 15% |
| ethyl methacrylate | — | 84½% |
| Lubersol 256 | — | ½% |

The resulting composition shows good properties for use as a hard plastic contact lens material.

The process set forth in Example I above may be repeated and ethyl methacrylate substituted in lieu of the n-butyl methacrylate. The resulting composition exhibits similarly good characteristics when formulated into a contact lens in that one obtains a contact lens having good optic characteristics as well as easy machinability and good compatibility with the tear fluid. Other variations may be made in the materials forming a part of the composition of the present invention within the ranges set forth herein. Similarly, the temperature ranges of the polymerization process as well as the curing process may be varied without affecting the characteristics of the resulting compostion. For example, the polymerization reaction may be carried out at temperatures as high as 150°F., although in such case, the amount of the catalyst may be descreased somewhat in order to counteract the tendency of the increased amount of heat in causing quick polymerization of the materials thereby resulting in seams or cracks occurring in the solid mass. It is for this reason that temperatures above 150°F. are not presently recommended.

While there has been described what is at present considered to be the preferred embodiments of the invention, it will be understood that various modifications may be made herein and it is intended to cover in the appended claims all such modifications as fall within the true spirit and scope of the invention.

What we claim is:

1. A cross-linked polymerized composition comprising a copolymer including from about 10 percent to about 35 percent by weight of triethylene glycol dimethacrylate, from about 5 percent to about 35 percent by weight of hydroxy ethyl methacrylate, and from about 55 percent to about 70 percent of n-butyl methacrylate or ethyl methacrylate.

* * * * *

UNITED STATES PATENT OFFICE
CERTIFICATE OF CORRECTION

Patent No. 3,892,721  Dated July 1, 1975

Inventor(s) Robert Gustafson

It is certified that error appears in the above-identified patent and that said Letters Patent are hereby corrected as shown below:

The term of this patent subsequent to April 17, 1990 has been disclaimed.

Signed and Sealed this

Fourteenth Day of September 1976

[SEAL]

Attest:

RUTH C. MASON
Attesting Officer

C. MARSHALL DANN
Commissioner of Patents and Trademarks